US007012931B2

(12) United States Patent
Higuchi et al.

(10) Patent No.: US 7,012,931 B2
(45) Date of Patent: Mar. 14, 2006

(54) MULTICAST COMMUNICATION METHOD

(75) Inventors: Hidemitsu Higuchi, Ebina (JP); Sunao Sawada, Yokohama (JP); Shinji Nozaki, Yokohama (JP); Kazuaki Tsuchiya, Ebina (JP)

(73) Assignee: Hitachi, Ltd., Tokyo (JP)

( * ) Notice: Subject to any disclaimer, the term of this patent is extended or adjusted under 35 U.S.C. 154(b) by 927 days.

(21) Appl. No.: 09/822,294

(22) Filed: Apr. 2, 2001

(65) Prior Publication Data
US 2001/0053156 A1 Dec. 20, 2001

(30) Foreign Application Priority Data
Apr. 3, 2000 (JP) ............................. 2000-100901

(51) Int. Cl.
*H04J 3/16* (2006.01)
(52) U.S. Cl. ...................... 370/467; 370/465; 370/466
(58) Field of Classification Search ................ 370/389, 370/392, 400–401, 474, 465–467
See application file for complete search history.

(56) References Cited

U.S. PATENT DOCUMENTS

| 5,898,686 | A | 4/1999 | Virgile | |
|---|---|---|---|---|
| 6,272,134 | B1 * | 8/2001 | Bass et al. ................... | 370/390 |
| 6,526,054 | B1 * | 2/2003 | Li et al. ...................... | 370/390 |
| 6,751,218 | B1 * | 6/2004 | Hagirahim et al. ......... | 370/390 |
| 2002/0075872 | A1 * | 6/2002 | Ogawa et al. .............. | 370/392 |

FOREIGN PATENT DOCUMENTS

| EP | 0 840482 | 5/1998 |
|---|---|---|
| JP | 11-252172 | 9/1999 |

OTHER PUBLICATIONS

Tsirtsis, G. et al, Network Address Translation—Protocol Translation (NAT-PT), The Internet Society, 2000, pp. 1-21.
"Universal Protocol Conversion", IBM Technical Disclosure Bulletin, vol. 38, No. 12, Dec. 1995, pp. 323-324.
RFC 1112 issued by IETF.
RFC 2236 issued by IETF.
RFC 1933 issued by IETF.
RFC 2710 issued by IETF.

* cited by examiner

*Primary Examiner*—Huy D. Vu
*Assistant Examiner*—Jason Mattis
(74) *Attorney, Agent, or Firm*—Mattingly, Stanger, Malur & Brundidge, P.C.

(57) ABSTRACT

A multicast communication method for allowing a communication control apparatus for communicating in accordance with IPv4 to communicate with a communication control apparatus for communicating in accordance with IPv6. This method includes the steps of: when an IPv4 multicast packet is inputted, discriminating that this packet is a data packet on the basis of an IPv4 header; when it is determined that the packet is the data packet, converting the IPv4 header of the IPv4 multicast packet into an IPv6 header; generating an IPv6 multicast packet; and outputting the generated IPv6 multicast packet to a IPv6 network.

2 Claims, 17 Drawing Sheets

MULTICAST COMMUNICATION METHOD

CROSS-REFERENCE TO RELATED APPLICATIONS

This application relates to U.S. patent application Ser. No. 09/257,003 filed on Feb. 25, 1999 now U.S. Pat. No. 6,508,717 based on Japanese Patent Application Number 10-046739 filed on Feb. 27, 1998 and U.S. patent application Ser. No. 09/614,715 filed on Jul. 6, 2000 now U.S. Pat. No. 6,690,669 based on Japanese Patent Application Number 8-291480 and 9-212889, both of which are assigned to the present assignee. The contents of those applications are incorporated herein by reference.

BACKGROUND OF THE INVENTION

The present invention relates to a multicast communication method. The invention also relates to a multicast communication method which is applied to, for example, a method of making an IPv4 network-compatible multicast application operative on an IPv6 network, a packet generation method, an IP-network-dedicated translator, an NAT (Network Address Translator), a memory medium having a packet generation program recorded thereon, and the like.

In the field of information communication, generally, there is a method called multicast distribution as a method of simultaneously distributing same data from one host to a plurality of hosts. In the multicast distribution, one group is formed by a plurality of hosts and the same data is distributed from one of the hosts in the group to all of the other hosts by using one multicast packet.

The standard protocol in the Internet is a TCP/IP (Transmission Control Protocol/Internet Protocol) and the IP of version 4 (hereinafter, referred to as an IPv4) is widespread at the present time. Although the IP is at present being rapidly widespread for various communication services in cooperation with the spread of the Internet or the like, there is a serious problem such as a lack of IP addresses. As means for solving such a problem, the IP of version 6 (hereinafter, referred to as an IPv6) has been proposed at present. Also in the TCP/IPv4 and TCP/IPv6, there is a technique called an IP multicast using multicast distribution.

In the IP multicast, a specific IP address called an IP multicast address is specified every group and data is distributed to each host by using an IP multicast packet in which the IP multicast address is used as a destination IP address. As one of the protocols for the IPv4 multicast, for example, there is the IGMP (Internet Group Management Protocol) disclosed in RFC (Request For Comment) 1112 and RFC2236 as documents issued from the IETF (Internet Engineering Task Force). The IGMP is a protocol for allowing an IPv4 host to request an adjacent router to perform multicast distribution. Thus, the IPv4 host can receive the IPv4 multicast packet.

As one of protocols for the IPv6 multicast, there is the MLD (Multicast Listener Discovery) disclosed in RFC2710. The MLD is a protocol for allowing an IPv6 host to request an adjacent router to perform multicast distribution in a manner similar to the IGMP. Thus, the host can receive an IPv6 multicast packet.

At present, a large scale LAN is being formed in a form such that an LAN according to the IPv6 and an LAN according to the IPv4 mixedly exist. There is an RFC1933 as a document of standardization regarding the mutual adjacency of the LAN according to the IPv6 and the LAN according to the IPv4. According to the RFC1933 (Transition Mechanism for IPv6 Hosts and Routers: R. Gilligam, 1996. 4, IETF), in a communication control apparatus having IPv6 software, mutual adjacency of an IPv6 network is enabled by mapping an IPv4 address to an IPv6 address. A technique in which an IPv4-to-IPv6 protocol translation control module in the communication control apparatus enables an IPv4 application and an IPv6 host to communicate in unicast communication has been disclosed in JP-A-11-252172 (Japanese Patent Application No. 10-46739).

SUMMARY OF THE INVENTION

As mentioned above, a mixed existence environment of the IPv4 network and the IPv6 network is being formed at present. However, the number of IPv6 multicast-compatible applications (APs) is much smaller than the number of IPv4 multicast-compatible APs. Hitherto, there is not means for enabling the IPv4 multicast-compatible application on a personal computer/workstation (PC/WS) and the IPv6 multicast-compatible application on the PC/WS to communicate directly without intervention of a network apparatus such as an address translation router having an NAT function or the like.

In case of performing the IPv4 multicast communication, the IGMP for controlling the distribution of the IPv4 multicast data is indispensable. In case of performing the IPv6 multicast communication, the MLD for controlling the distribution of the IPv6 multicast data is indispensable. Therefore, although the IPv4-to-IPv6 translation communication control apparatus provided between the IPv4 host and the IPv6 host needs the function for translating the IGMP and the MLD, such means does not exist hitherto. The protocol translation control between the IGMP and the MLD is also indispensable in order to make the PC/WS on which the IPv4 multicast-compatible application operates operative on the IPv6 network.

In consideration of the above points, the invention mainly has the following objects.

(1) To enable the IPv4 multicast-compatible application on the PC/WS to communicate directly with the IPv6-compatible application on the PC/WS without intervention of the network apparatus such as an address translation router having the NAT function or the like.

(2) To enable the IP multicast packet which is outputted from the IPv4 host to be received by the IPv6 host and to enable the IP multicast packet which is outputted from the IPv6 host to be received by the IPv4 host.

The LAN control apparatus such as PC/WS or the like generally has an IPv4-compatible AP (application), an IPv4-compatible protocol control module, and a plurality of LAN control modules. Further, according to the invention, to accomplish the above objects, an IGMP-to-MLD translation control module is provided in the protocol translation control module between the protocol translation control module and the LAN control modules in the LAN control apparatus. Besides the IGMP-to-MLD translation control module, an Ipv4-to-IPv6 transmission switch control module, an IPv4-to-IPv6 reception switch control module, an IP header conversion control module, and an IPv6 transmission/reception control module are provided in the protocol translation control module.

To solve the above problem, the IGMP-to-MLD translation control module mainly translates an IGMP packet which is outputted from the protocol control module into an MLD packet and outputs it to the network through the LAN control module. The IGMP-to-MLD translation control module translates an MLD packet inputted from the network into an IGMP packet and outputs it to the protocol translation control module. Thus, the IPv4 multicast application in the communication control apparatus can be communicated on the IPv6 network.

To solve the above problem, according to the invention, an IPv4-to-IPv6 transmission/reception switch control module in the LAN control apparatus discriminates the IGMP packet in the IPv4 packet which is inputted from the IPv4 network and sends it to the IGMP-to-MLD translation control module. The IGMP-to-MLD translation control module translates the IGMP packet into the MLD packet and outputs it to the IPv6 network through the LAN control module. After that, if the IPv4 multicast packet is inputted, an IP header conversion control module converts it into the IPv6 multicast packet and outputs it to the IPv6 network.

The IPv4-to-IPv6 transmission/reception switch control module in the LAN control apparatus discriminates the MLD packet in the IPv6 packet which is inputted from the IPv6 network and sends it to the IGMP-to-MLD translation control module. The IGMP-to-MLD translation control module translates the MLD packet into the IGMP packet and outputs it to the IPv4 network through the LAN control module. After that, if the IPv6 multicast packet is inputted, an IP header conversion control module converts it into the IPv4 multicast packet and outputs it to the IPv4 network.

As mentioned above, according to the invention, the IP multicast packet which is outputted from the IPv4 host can be received by the IPv6 host and the IP multicast packet which is outputted from the IPv6 host can be received by the IPv4 host.

DESCRIPTION OF THE EMBODIMENTS

Figure 1:
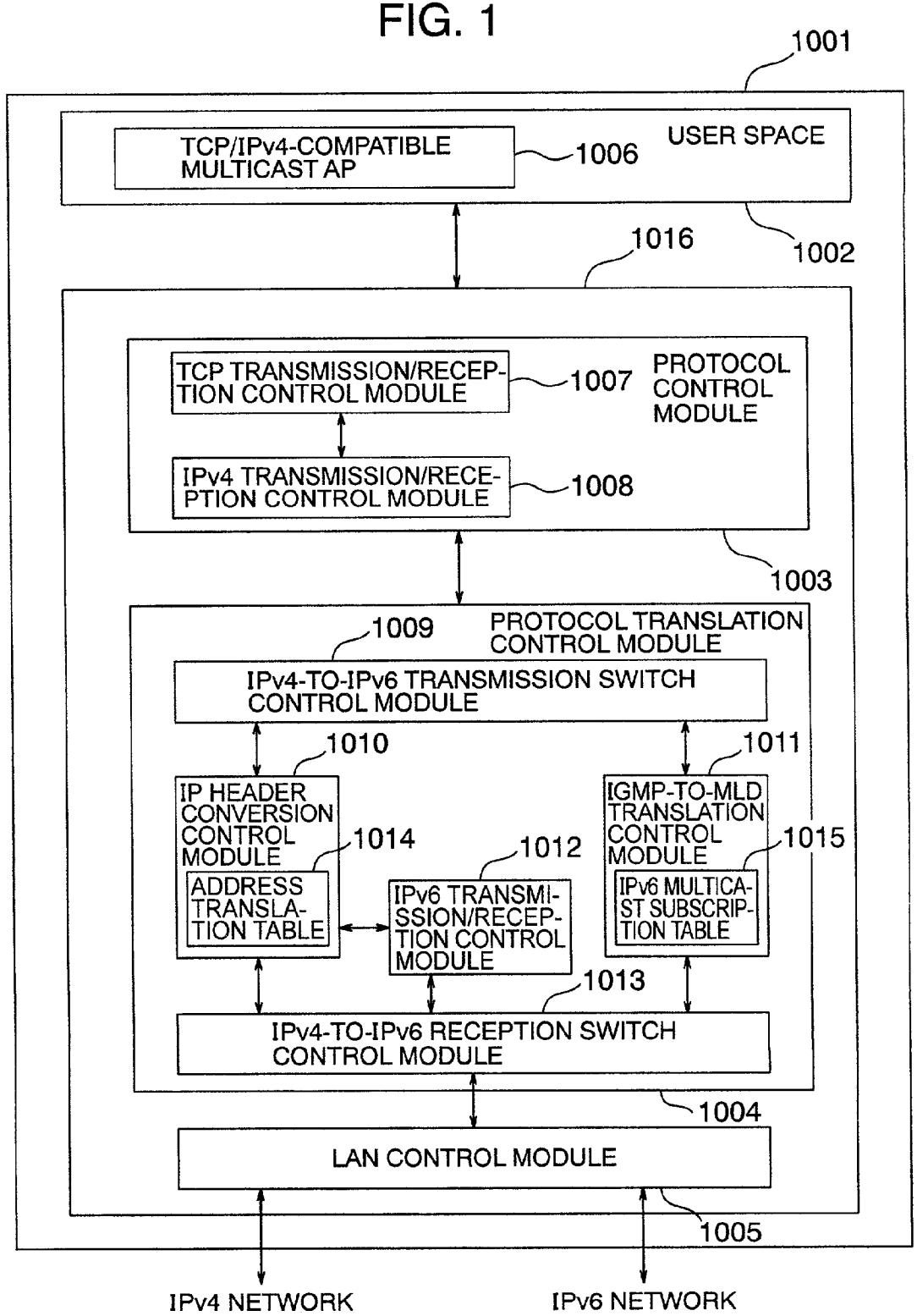
FIG. 1 is a diagram showing a construction of an LAN control apparatus according to an embodiment of the invention.
Figure 2:
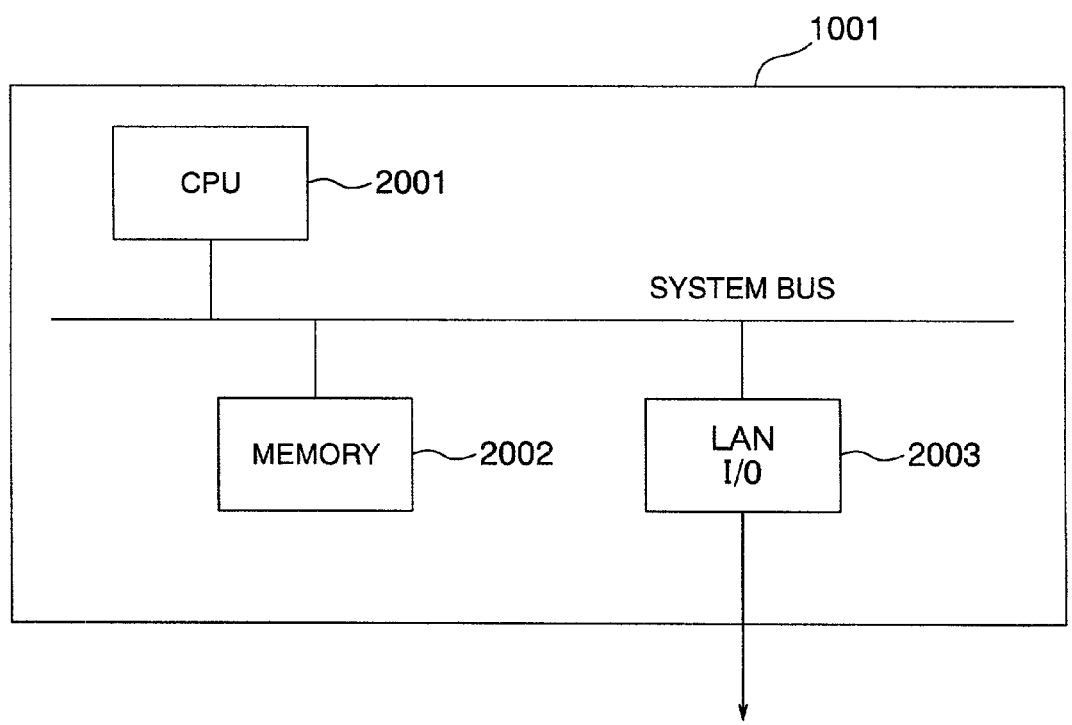
FIG. 2 is a diagram showing a construction of an information processing apparatus.

An embodiment of the invention will now be described. First, a construction of an LAN control apparatus using the embodiment will be described. FIG. 1 is a diagram showing a construction of an LAN control apparatus 1001. FIG. 2 is a diagram showing a construction of an information processing apparatus. The information processing apparatus shown in FIG. 2 is, for example, a personal computer (PC), a workstation (WS), an inter-network connecting apparatus, or the like. As one component of the information processing apparatus shown in FIG. 2, the LAN control apparatus shown in FIG. 1 is included in the information processing apparatus. Each component element of the LAN control apparatus shown in FIG. 1 is included in, for example, a memory 2002 or a CPU 2001 in the information processing apparatus shown in FIG. 2 and executed in the memory 2002 or CPU 2001.

In FIG. 1, the LAN control apparatus 1001 has a user space 1002 where an application (AP) operates and a kernel space 1016 where a kernel operates. The user space 1002 has a TCP/IPv4-compatible multicast AP 1006. The kernel space 1016 has a protocol control module 1003, a protocol translation control module 1004, and an LAN control module 1005. The protocol control module 1003 has a TCP transmission/reception control module 1007 and an IPv4 transmission/reception control module 1008. The protocol translation control module 1004 has an IPv4-to-IPv6 transmission switch control module 1009, an IP header conversion control module 1010, an IGMP-to-MLD translation control module 1011, an IPv6 transmission/reception control module 1012, and an IPv4-to-IPv6 reception switch control module 1013. The IPv4-to-IPv6 reception switch control module 1013 can also include the IPv6 transmission/reception control module 1012.

In the embodiment, each of the protocol control module 1003, protocol translation control module 1004, and LAN control module 1005 is constructed as a program (software) and executed in the kernel space. The protocol control module 1003, protocol translation control module 1004, and LAN control module 1005 can be also constructed as independent programs or two or more of them can be also combined and constructed as one program. Each program constructing the protocol control module 1003, protocol translation control module 1004, and LAN control module 1005 is installed into the information processing apparatus shown in FIG. 2 and stored into an arbitrary area in the memory 2002 in the information processing apparatus. The user space 1002 and kernel space 1016 are also stored in arbitrary areas in the memory 2002. The CPU 2001 in the information processing apparatus executes each program by using the kernel space 1016, so that each of the protocol control module 1003, protocol translation control module 1004, and LAN control module 1005 operates.

An interface between the TCP/IPv4-compatible multicast AP 1006 and the protocol control module 1003 is executed by inputting and outputting a data packet which is generated by the TCP/IPv4-compatible multicast AP 1006. An interface between the protocol control module 1003 and the protocol translation control module 1004 is executed by inputting and outputting the IPv4 packet.

Figure 3:
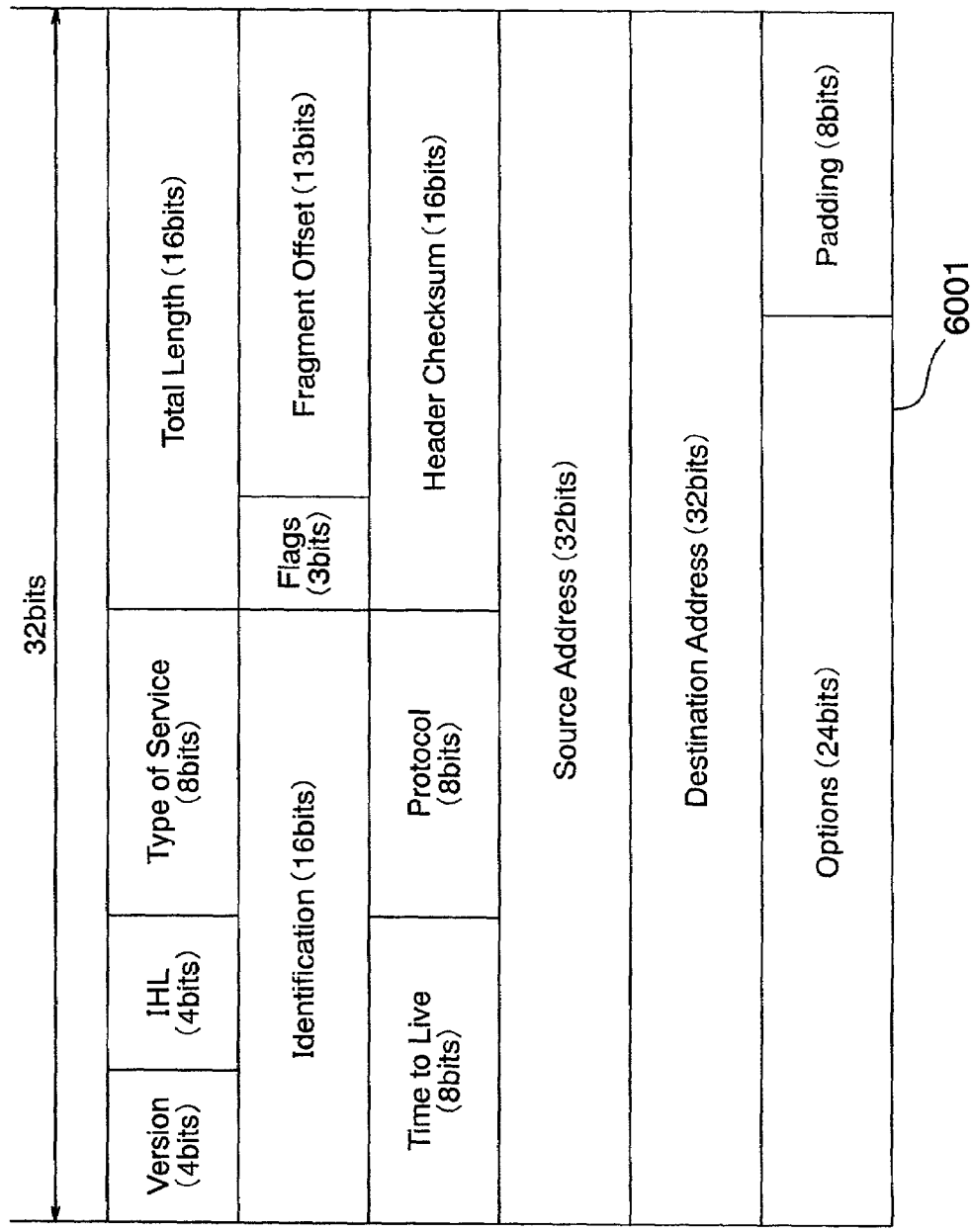
FIG. 3 is a diagram for explaining an IPv4 header format.
Figure 4:
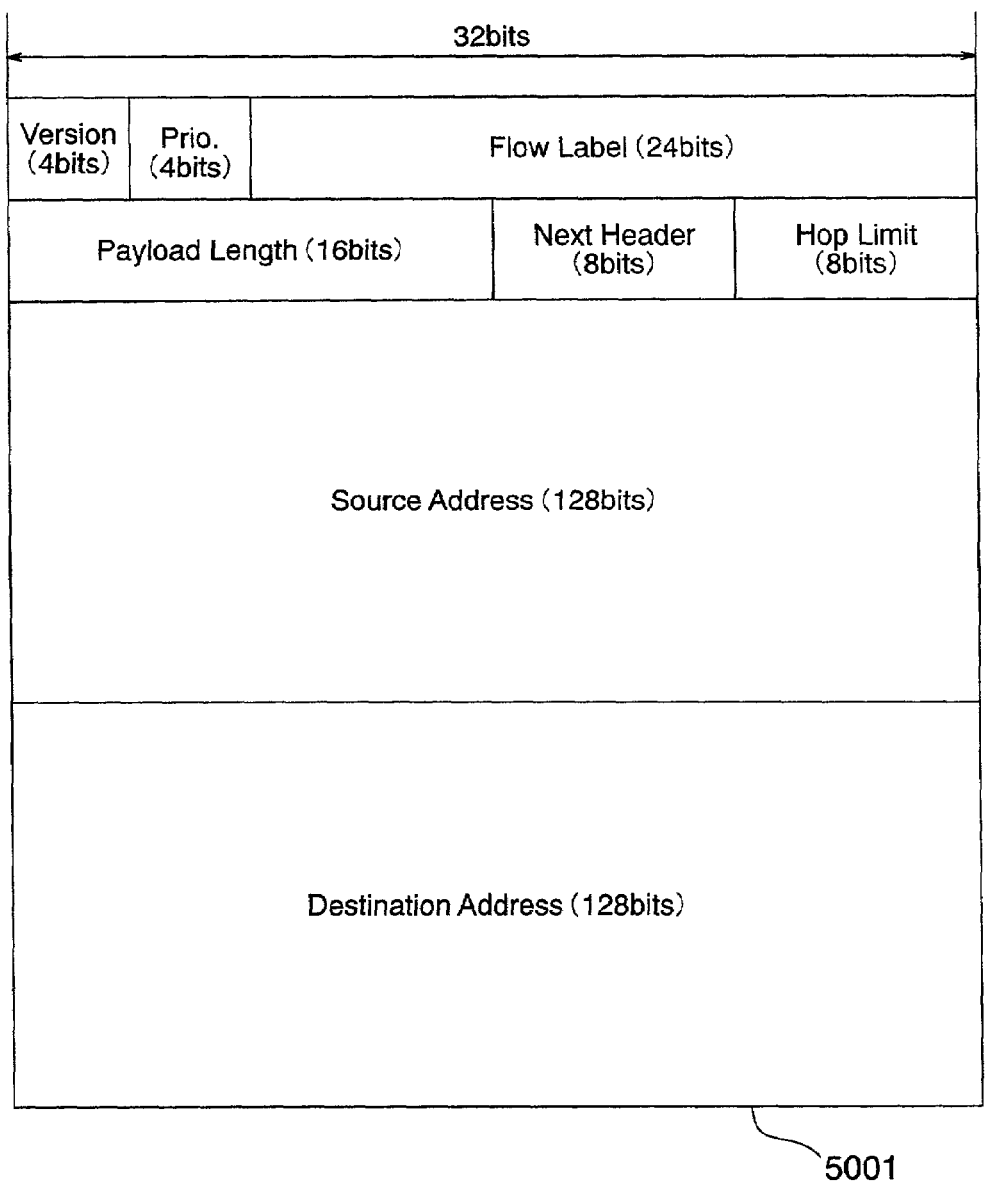
FIG. 4 is a diagram for explaining an IPv6 header format.

FIG. 3 is a diagram for explaining an IPv4 header format. FIG. 4 is a diagram for explaining an IPv6 header format. The IPv4 packet is a packet comprising: a data packet field in which the data packet is inserted; an IPv4 header field in which the IPv4 header shown in FIG. 3 is inserted; and an MAC (Media Access Control) header field in which an MAC header (not shown) is inserted. An interface between the protocol translation control module 1004 and the LAN control module 1005 is executed by inputting and outputting the IPv4 packet or IPv6 packet. The IPv6 packet is a packet comprising: a data packet field; an IPv6 header field in which the IPv6 header shown in FIG. 4 is inserted; and an MAC header field.

An input/output interface between the control modules in the protocol translation control module will now be described. A control is made between all of the control modules in the protocol translation control module by inputting and outputting the IPv4 packet or IPv6 packet.

Functions of each control module will now be described.

The IPv4-to-IPv6 transmission switch control module 1009 has a packet switching function for the IPv4 packet sent from the protocol control module 1003 and a local IPv4 address deciding function. Processing contents of them will be described in detail hereinlater.

The IPv6 transmission/reception control module 1012 executes an IPv6 protocol process.

An address translation table 1014 provided in the IP header conversion control module 1010 is a compatible table of an IPv4 address and an IPv6 address. The IP header conversion control module 1010 executes a conversion between the IPv4 header and the IPv6 header by using information registered in the address translation table 1014.

The IGMP-to-MLD translation control module 1011 executes a translation between the IGMP packet and the MLD packet by using information registered in an IPv6 multicast subscription table 1015. The IGMP packet is a packet such that the IGMP header and the data packet have been inserted in a data packet field in the IPv4 packet. The MLD packet is a packet such that the MLD header and the data packet have been inserted in a data packet field in the IPv6 packet.

Figure 5:
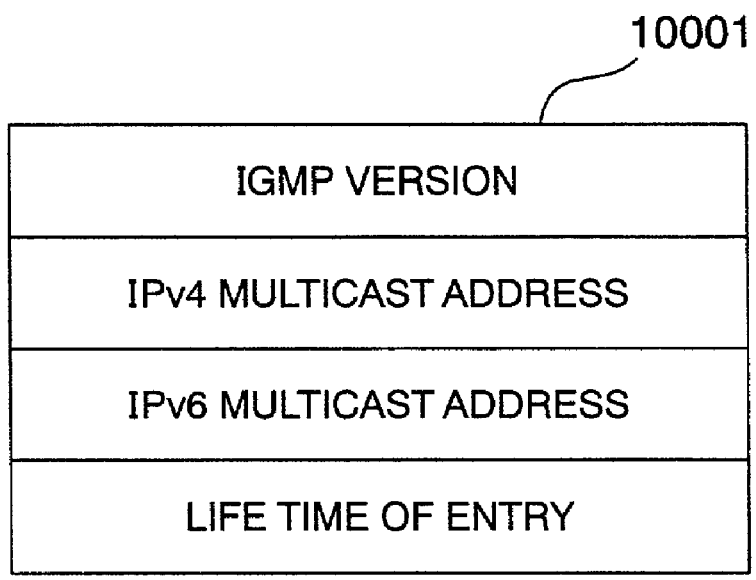
FIG. 5 is a diagram showing a construction of entries in an IPv6 multicast subscription table.

FIG. 5 is a diagram showing a construction of entries in the IPv6 multicast subscription table 1015. The IPv6 multicast subscription table 1015 in the IGMP-to-MLD translation control module 1011 is a table including a plurality of entries as shown in the diagram. In FIG. 5, an IGMP version indicates a version of the IGMP which is supported by the IGMP function of the protocol control module 1003. The IPv4 multicast address and IPv6 multicast address show a correspondence relation of an IPv4/IPv6 multicast group for which the LAN control apparatus subscribes at present. A life time of the entry indicates the maximum time when the entry is valid.

The IPv4-to-IPv6 reception switch control module 1013 has a packet switching function for the reception packet (IPv4 packet or IPv6 packet) from the LAN control module 1005.

Figure 6:
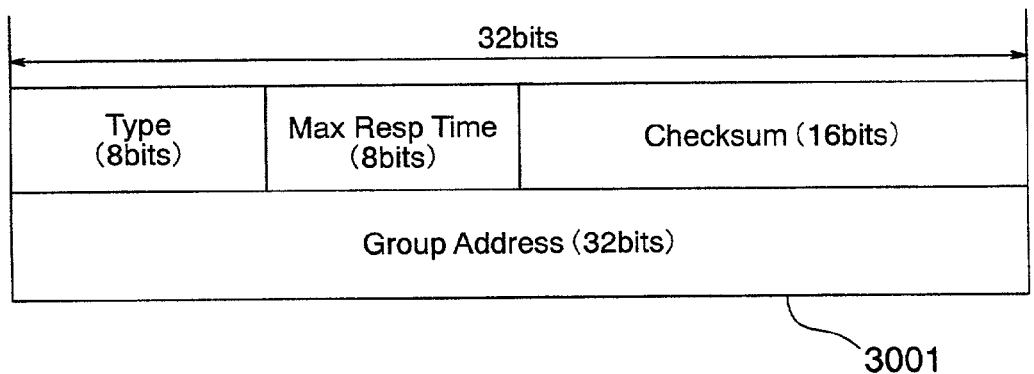
FIG. 6 is a diagram for explaining an IGMP header format.

FIG. 6 is a diagram for explaining an IGMP header format. A Type field shows a type of message of the IGMP. As types, there are Membership Query (multicast group query), Membership Report (multicast group report), and Leave Group (leaving from the multicast group). Max Resp Time indicates a maximum delay time which is necessary for transmitting the IGMP packet in which the type of IGMP header indicates Membership Report to the IGMP packet in which the type of IGMP header indicates Membership Query. Group Address indicates an IPv4 multicast address.

Figure 7:
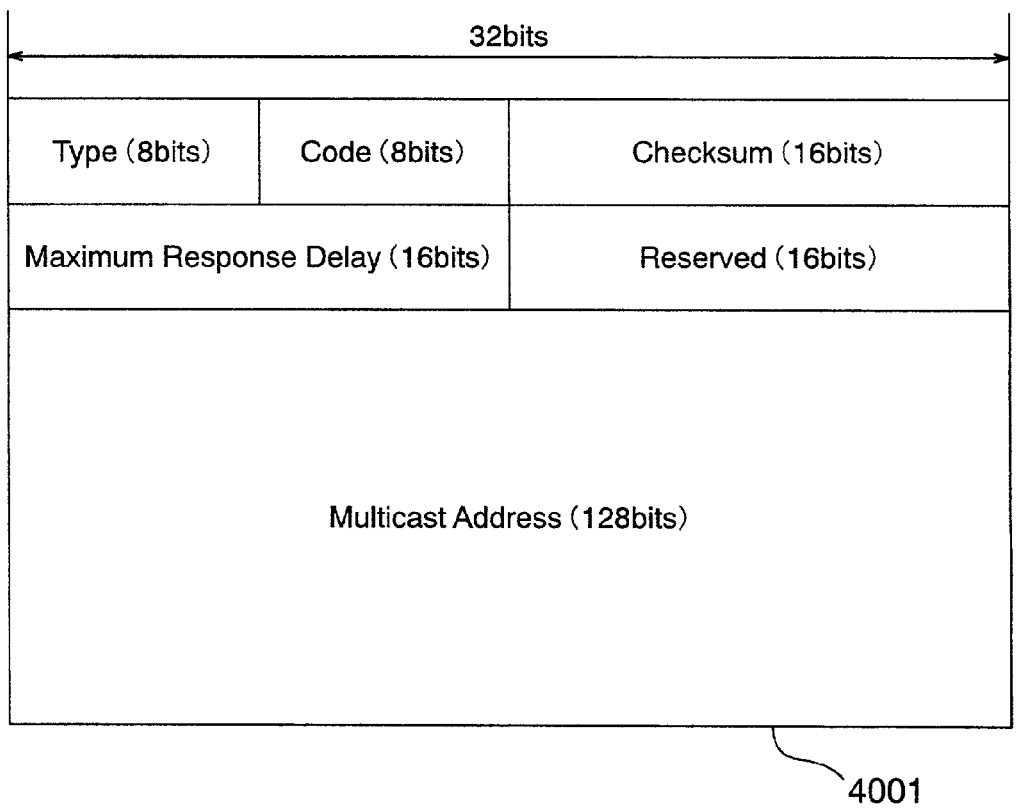
FIG. 7 is a diagram for explaining an MLD header format.

FIG. 7 is a diagram for explaining an MLD header format. A type field shows a type of MLD message. As types, there are Multicast Listener Query (multicast group query), Multicast Listener Report (Multicast group report), Multicast Listener Done (leaving from the multicast group), and the like. Maximum Response Delay shows a maximum delay time which is necessary for transmitting the MLD packet in which the type of MLD header indicates Multicast Listener Report to the MLD packet in which the type of MLD header indicates Multicast Listener Query. An IPv6 multicast address enters Multicast Address.

A flow of data upon transmission of the multicast data will now be described.

First, the TCP/IPv4-compatible multicast AP 1006 forms multicast data and sends it to the protocol control module 1003. The protocol control module 1003 adds a TCP (Transmission Control Protocol) header, a UDP (User Datagram Protocol) header, or an IPv4 header to the multicast data and generates the IPv4 multicast packet. The protocol control module 1003 sends the IPv4 multicast packet to the protocol translation control module 1004. At this time, a Destination Address field of the IPv4 header shows the IPv4 multicast address. When the IPv4 multicast packet is received, the IPv4-to-IPv6 transmission switch control module 1009 in the protocol translation control module 1004 discriminates that it is the ordinary data packet by checking the IPv4 header.

The IPv4-to-IPv6 transmission switch control module 1009 sends the IPv4 multicast packet to the IP header conversion control module 1010. The IP header conversion control module 1010 refers to the address translation table 1014 and translates each of two IPv4 addresses inserted in the Destination Address field and the Source Address field in the IPv4 header into an IPv6 address. When the IPv4 address inserted in the Source Address field of the IPv4 header is not registered in the address translation table 1014, for example, the IP header conversion control module 1010 adds a fixed pattern of 96 bits into the IPv4 address and forms the IPv6 address of 128 bits, thereby translating the IPv4 address into the formed IPv6 address. The whole IPv4 header is converted into the IPv6 header. By converting the header as mentioned above, the IPv4 multicast packet is translated into the IPv6 multicast packet. The IPv6 multicast packet is outputted from the LAN control module 1005 to the IPv6 network through the IPv6 transmission/reception control module 1012 and IPv4-to-IPv6 reception switch control module 1013.

A multicast control upon reception of the multicast data and a flow of the multicast data will now be described.

When the TCP/IPv4-compatible multicast AP 1006 wants to receive the multicast packet having a certain multicast address as a destination address, the TCP/IPv4-compatible multicast AP 1006 needs to subscribe for a multicast group to which the multicast packet is distributed. For this purpose, the TCP/IPv4-compatible multicast AP 1006 issues a control command to the protocol control module 1003; that is, the control command to output a control packet for requesting the subscription for the multicast group (for requesting the distribution of the multicast packet) to the network. In response to such a control command, the IPv4 transmission/reception control module 1008 of the protocol control module 1003 generates the IGMP packet and sends it to the protocol translation control module 1004. When the IGMP packet is received, the IPv4-to-IPv6 transmission switch control module 1009 in the protocol translation control module 1004 refers to the IGMP header and sends the IGMP packet to the IGMP-to-MLD translation control module 1011. The IGMP-to-MLD translation control module 1011 converts the IGMP header into the MLD header and translates the IGMP packet into the MLD packet. At this time, the IGMP-to-MLD translation control module 1011 registers correspondence information between the IPv4 multicast address inserted in the Destination Address field of the IGMP header and the IPv6 multicast address inserted in the Destination Address field of the MLD header into the IPv6 multicast subscription table 1015 and address translation table 1014, respectively. The MLD packet is transmitted from the IGMP-to-MLD translation control module 1011 to the IPv4-to-IPv6 reception switch control module 1013 and outputted from the LAN control module 1005 to the IPv6 network via the IPv4-to-IPv6 reception switch control module 1013.

When the IPv6 multicast packet is received from the IPv6 network, the LAN control module 1005 sends the IPv6 multicast packet to the IPv4-to-IPv6 reception switch control module 1013. The IPv4-to-IPv6 reception switch control module 1013 discriminates whether the two IPv6 addresses inserted in the Destination Address field and the Source Address field of the IPv6 header in the IPv6 multicast packet received from the LAN control module 1005 have been registered in the address translation table 1014 or not, respectively. If they have been registered, the IPv6 multicast packet is sent to the IP header conversion control module 1010. The IP header conversion control module 1010 translates the two IPv6 addresses included in the IPv6 header into the IPv4 addresses in accordance with the information registered in the address translation table 1014 and converts the whole IPv6 header into the IPv4 header. If the IPv6 address inserted in the Source Address field of the IPv6 header is not registered in the address translation table 1014, for example, the IP header conversion control module selects an arbitrary one of the one or more IPv4 addresses which have previously been obtained and pooled and translates the IPv6 address into the selected IPv4 address. Correspondence information between those IPv6 address and IPv4 address is registered into the address translation table 1014. By converting the header as mentioned above, the IP header conversion control module 1010 translates the IPv6 multicast packet into the IPv4 multicast packet and sends the IPv4 multicast packet to the protocol control module 1003 through the IPv4-to-IPv6 transmission switch control module 1009. The protocol control module 1003 protocol processes the IPv4 multicast packet, extracts the multicast data, and sends it to the TCP/IPv4-compatible multicast AP 1006.

Figure 8:
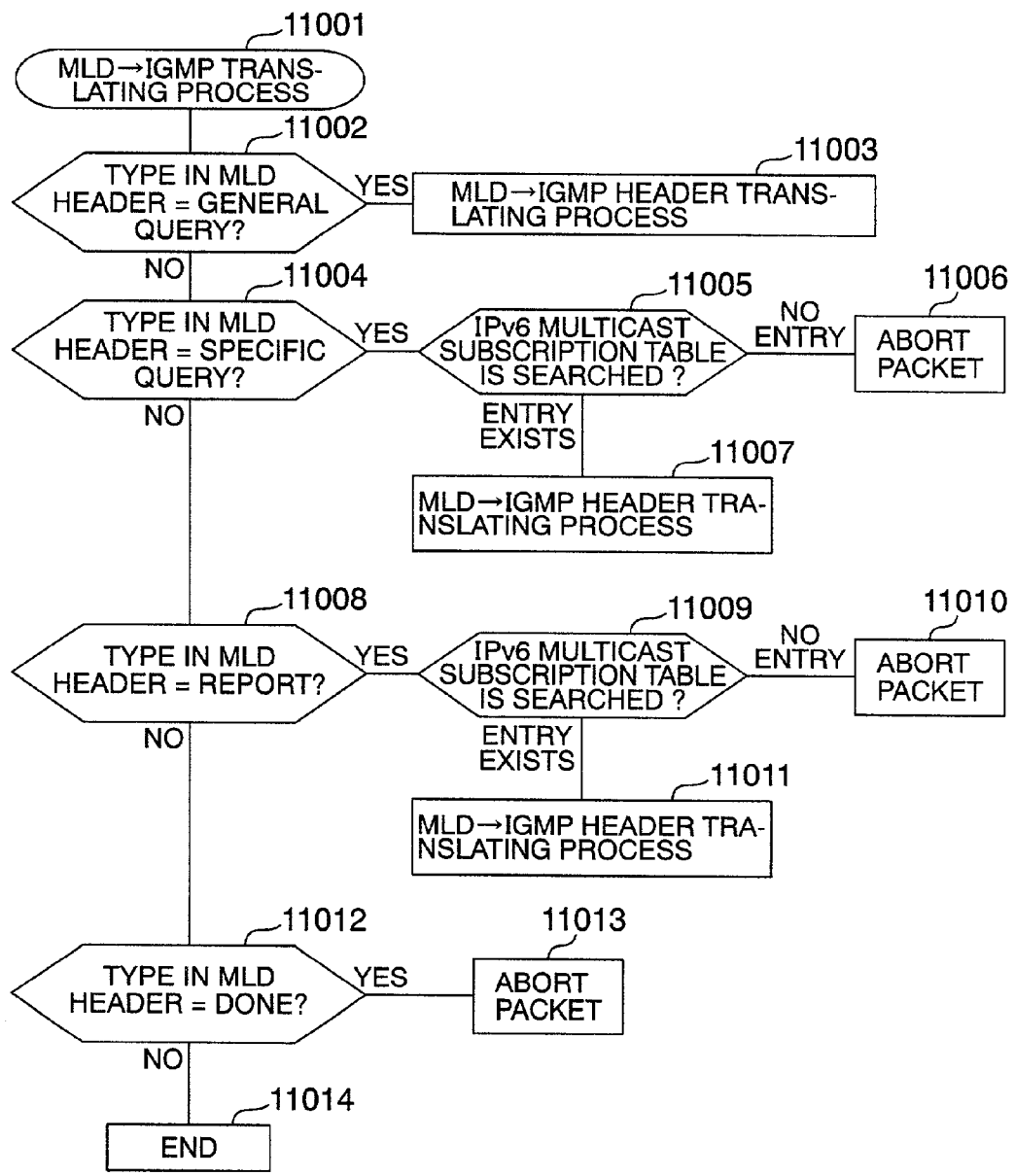
FIG. 8 is a diagram showing a processing flow for translating an MLD packet into an IGMP packet.
Figure 9:
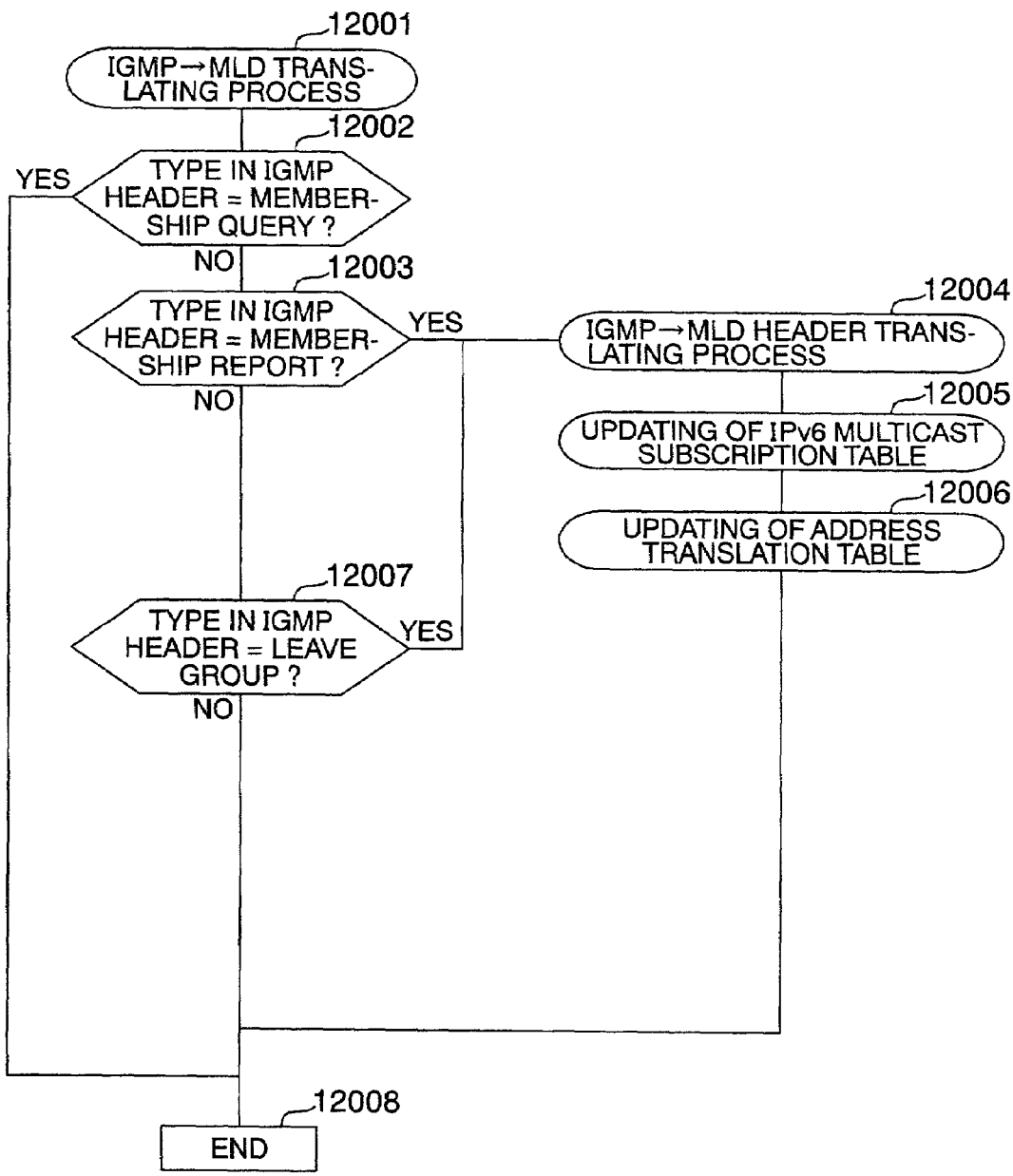
FIG. 9 is a diagram showing a processing flow for translating the IGMP packet into the MLD packet.

Subsequently, a processing flow of the IGMP-to-MLD translation control module 1011 will be described. FIG. 8 is a diagram showing a processing flow for translating the MLD packet into the IGMP packet. FIG. 9 is a diagram showing a processing flow for translating the IGMP packet into the MLD packet.

The processing flow for translating the MLD packet into the IGMP packet will be first described with reference to FIG. 8. When the MLD packet is received from the IPv4-to-IPv6 reception switch control module 1004, the IGMP-to-MLD translation control module 1011 starts a process for translating the MLD packet into the IGMP packet (11001). The IGMP-to-MLD translation control module 1011 refers to the TYPE field of the MLD header. When the TYPE field indicates "Multicast Listener General Query" (11002), the IGMP-to-MLD translation control module 1011 translates the IPv6 multicast address inserted in the Multicast Address field of the MLD header into the IPv4 multicast address in accordance with the information registered in the IPv6 multicast subscription table 1015 and converts the whole MLD header into the IGMP header. The IGMP-to-MLD translation control module 1011 refers to the address translation table 1014 in the IP header conversion control module 1010, translates the IPv6 address included in the IPv6 header into the IPv4 address by using the information registered in the address translation table 1014 or by the foregoing method, and converts the whole IPv6 header into the IPv4 header (11003). The IGMP-to-MLD translation control module 1011, consequently, translates the MLD packet into the IGMP packet. If the TYPE field of the MLD header indicates "Multicast Listener Specific Query" or "Multicast Listener Report" (11004, 11008), the IGMP-to-MLD translation control module 1011 searches whether the IPv6 multicast address inserted in the Multicast Address field of the MLD header has been registered in the IPv6 multicast subscription table 1015 or not (11005, 11009). If there is not the entry in which the IPv6 multicast address has been registered, the received MLD packet is aborted (11006, 11010). If there is the entry in which the IPv6 multicast address has been registered, the IPv6 multicast address is translated into the IPv4 multicast address in accordance with the information registered in such an entry and the whole MLD header is converted into the IGMP header (11007, 11011). The IGMP-to-MLD translation control module 1011, consequently, translates the MLD packet into the IGMP packet. If the TYPE field of the MLD header indicates "Multicast Listener Done" (11012), the received MLD packet is aborted (11013).

Subsequently, the processing flow for translating the IGMP packet into the MLD packet will be described with reference to FIG. 9.

When the IGMP packet is received from the IPv4-to-IPv6 transmission switch control module 1009, the IGMP-to-MLD translation control module 1011 starts a process for translating the IGMP packet into the MLD packet (12001). The IGMP-to-MLD translation control module 1011 refers to the TYPE field of the IGMP header. If the TYPE field indicates "Membership Query", the IGMP-to-MLD translation control module 1011 finishes the process. If the TYPE field of the IGMP header indicates "Membership Report" (12003), the IGMP-to-MLD translation control module 1011 translates the IPv4 multicast address inserted in the Group Address field of the IGMP header into the IPv6 multicast address in accordance with a predetermined translation method. As a translation method, for example, there is a method of forming the IPv6 multicast address of 128 bits by adding a predetermined pattern of 96 bits to the IPv4 multicast address. The IGMP-to-MLD translation control module 1011 executes a process for converting the IGMP header into the MLD header (12004) and translates the IGMP packet into the MLD packet. The IGMP-to-MLD translation control module 1011 registers correspondence information between the IPv4 multicast address inserted in the Group Address field of the IGMP header and the IPv6 multicast address obtained by translating it into the IPv6 multicast subscription table 1015 and the address translation table 1014 in the IP header conversion control module 1010, and updates each table, respectively (12005, 12006). Also in the case where the TYPE field of the IGMP header indicates "Leave Group" (12007), processes similar to those in the case where the TYPE field indicates "Membership Report" are executed.

Figure 10:
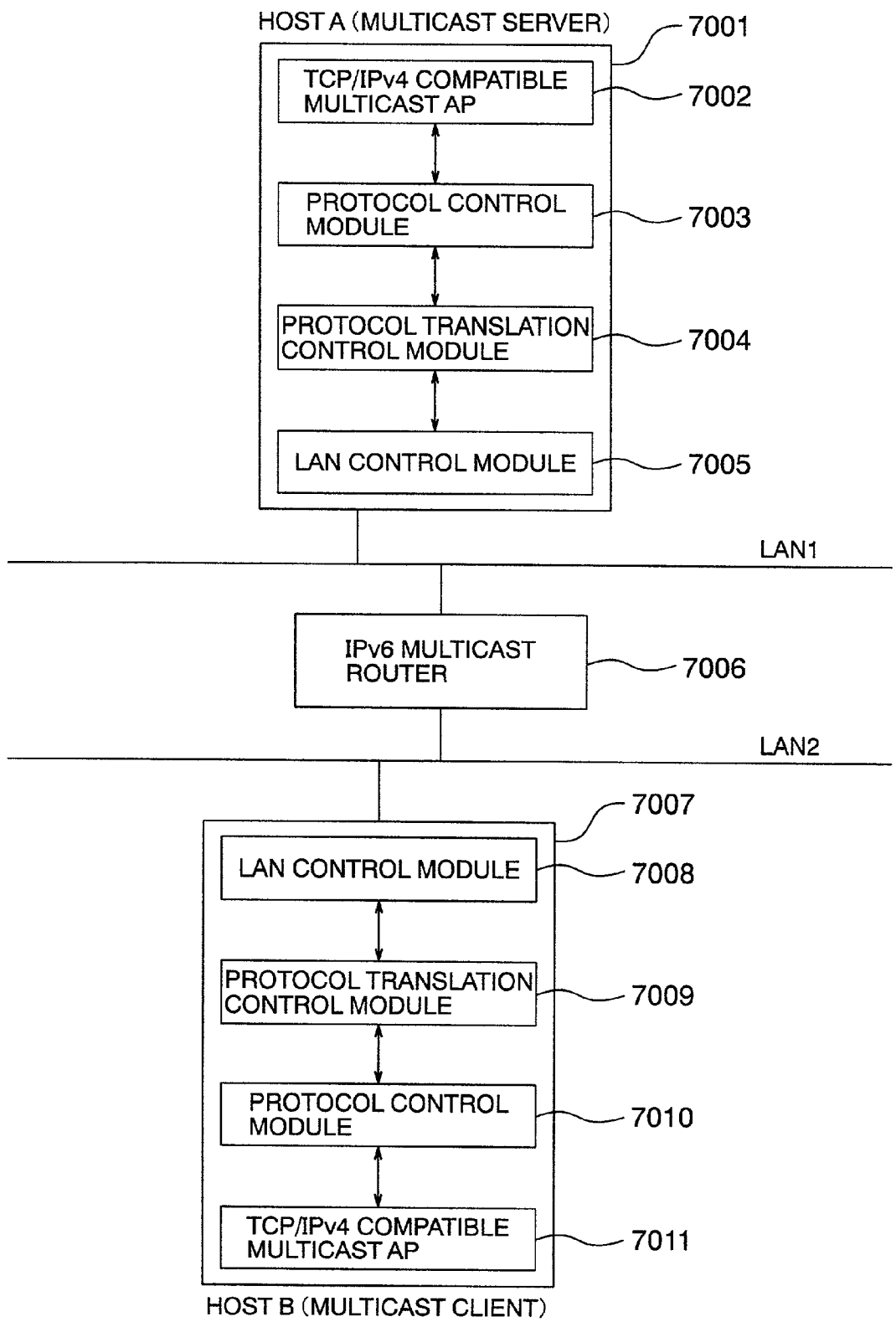
FIG. 10 is a diagram showing a construction of a communication network system.
Figure 11:
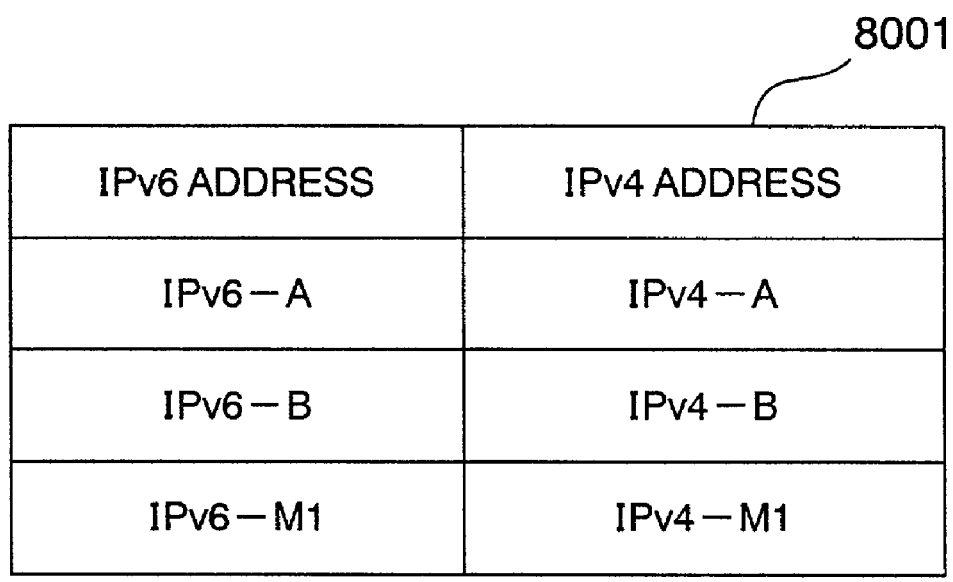
FIG. 11 is a diagram showing a construction of an address translation table of a host A shown in FIG. 10.
Figure 12:
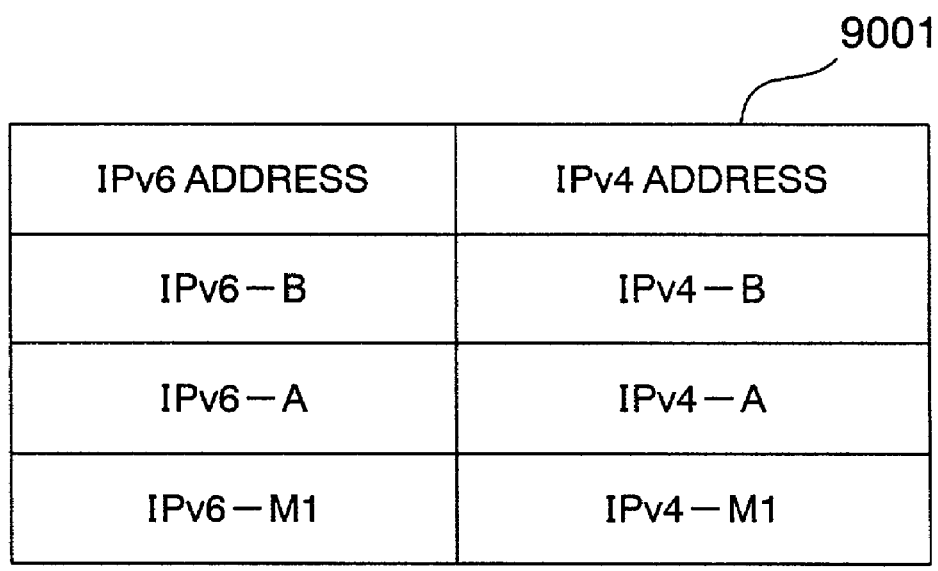
FIG. 12 is a diagram showing a construction of an address translation table of a host B shown in FIG. 10.
Figure 13:
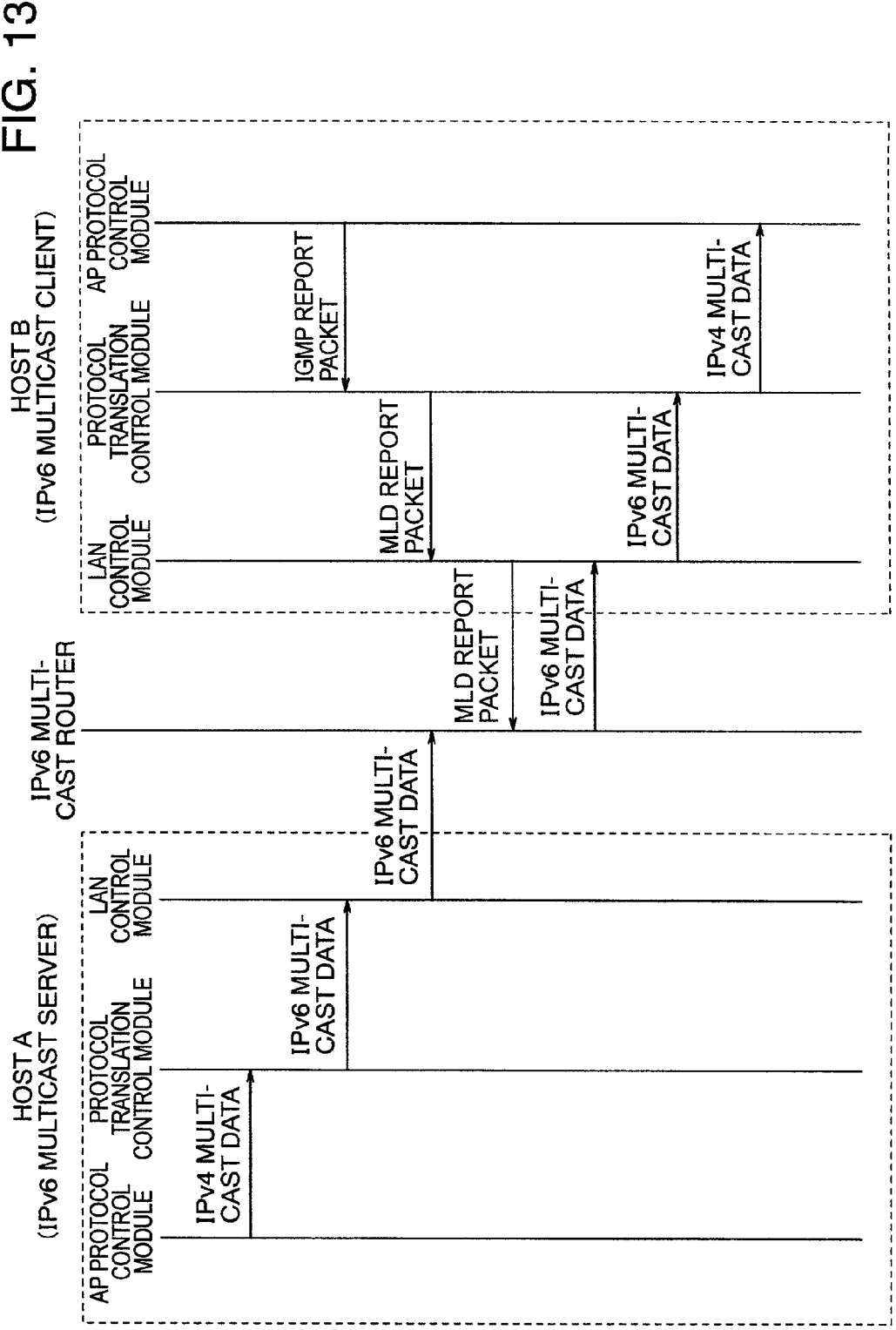
FIG. 13 is a sequence diagram of packet data in the communication network system shown in FIG. 10.

A data sequence in a multicast communication network system will be described. FIG. 10 is a diagram showing a construction of a communication network system using an information processing apparatus (server and client) including the LAN control apparatus shown in FIG. 1. FIG. 11 is a diagram showing a construction of an address translation table of the host A. FIG. 12 is a diagram showing a construction of an address translation table of the host B. FIG. 13 is a sequence diagram of a data packet in the communication network system shown in FIG. 10.

In FIG. 10, a host A 7001 is connected to an LAN1. In the host A 7001, a TCP/IPv4-compatible multicast AP for the server operates. A host B 7007 is connected to an LAN2. In the host B 7007, a TCP/IPv4-compatible multicast AP for the client operates.

In the system of FIG. 10, a data sequence by which the host B 7007 receives the multicast data packet which is transmitted by the host A 7001 will now be described with reference to FIG. 13.

A TCP/IPv4-compatible multicast AP 7002 of the host A 7001 forms multicast data and sends it to a protocol control module 7003. The protocol control module 7003 generates an IPv4 multicast data packet from the received multicast data and sends it to a protocol translation control module 7004. The protocol translation control module 7004 translates the IPv4 address included in the IPv4 header into an IPv6 address in accordance with information registered in an address translation control table 8001 shown in FIG. 11 and converts the IPv4 header into the IPv6 header. Thus, the IPv4 multicast data packet is translated into the IPv6 multicast data. The protocol translation control module 7004 sends the IPv6 multicast data packet to an LAN control module 7005. The LAN control module 7005 transmits the received the IPv6 multicast data packet to the LAN1. An IPv6 multicast router 7006 receives the IPv6 multicast data packet from the LAN1. However, at this time point, since the IPv6 multicast router 7006 does not recognize the host B 7007 connected to the LAN2 or the host B 7007 is not registered as a member of a group of the multicast communication, the received IPv6 multicast data packet is not routed to the LAN2.

On the other hand, a TCP/IPv4-compatible multicast AP (client software) of the host B 7007 instructs a protocol control module 7010 to output the IGMP packet in which the Type field of the IGMP header indicates "Membership Report" in order to receive the multicast data packet which is outputted from the host A 7001. The IGMP packet is a packet for requesting the IPv6 multicast router 7006 to distribute the multicast data packet. The protocol control module 7010 generates the IGMP packet in accordance with the instruction and sends it to a protocol translation control module 7009. The protocol translation control module 7009 translates the IPv4 multicast address inserted in the Group Address field of the IGMP header into the IPv6 multicast address in accordance with the translation method as mentioned above and converts the IGMP header into the MLD header. Consequently, the IGMP packet is translated into the MLD packet. In the MLD packet, the Type field of the MLD header indicates "Multicast Listener Report". The protocol translation control module 7009 sends the MLD packet to an LAN control module 7008. The LAN control module 7008 outputs the MLD packet to the LAN2.

When the MLD packet is received from the LAN2, the IPv6 multicast router 7006 recognizes the fact that the host B 7007 as a client has been connected to the LAN2 side. The IPv6 multicast router 7006 routes the IPv6 multicast data packet sent from the host A 7001 to the LAN1 to the LAN2.

When the IPv6 multicast data packet is received from the LAN2, the LAN control module 7008 of the host B 7007 sends it to the protocol translation control module 7009. The protocol translation control module 7009 translates the IPv6 address included in the IPv6 header into the IPv4 address in accordance with information registered in an address translation table 9001 shown in FIG. 12. If it is not registered in the address translation table 9001, the IPv6 address is translated into the IPv4 address by the method as mentioned above. The protocol translation control module 7009 converts the IPv6 header into the IPv4 header and translates the IPv6 multicast data packet into the IPv4 multicast data packet. The protocol translation control module 7009 sends the IPv4 multicast data packet to the protocol control module 7010. The protocol control module 7010 extracts the multicast data from the received IPv4 multicast data packet and sends it to a TCP/IPv4-compatible multicast AP 7011. Thus, the TCP/IPv4-compatible multicast AP 7011 can receive the multicast data.

Figure 14:
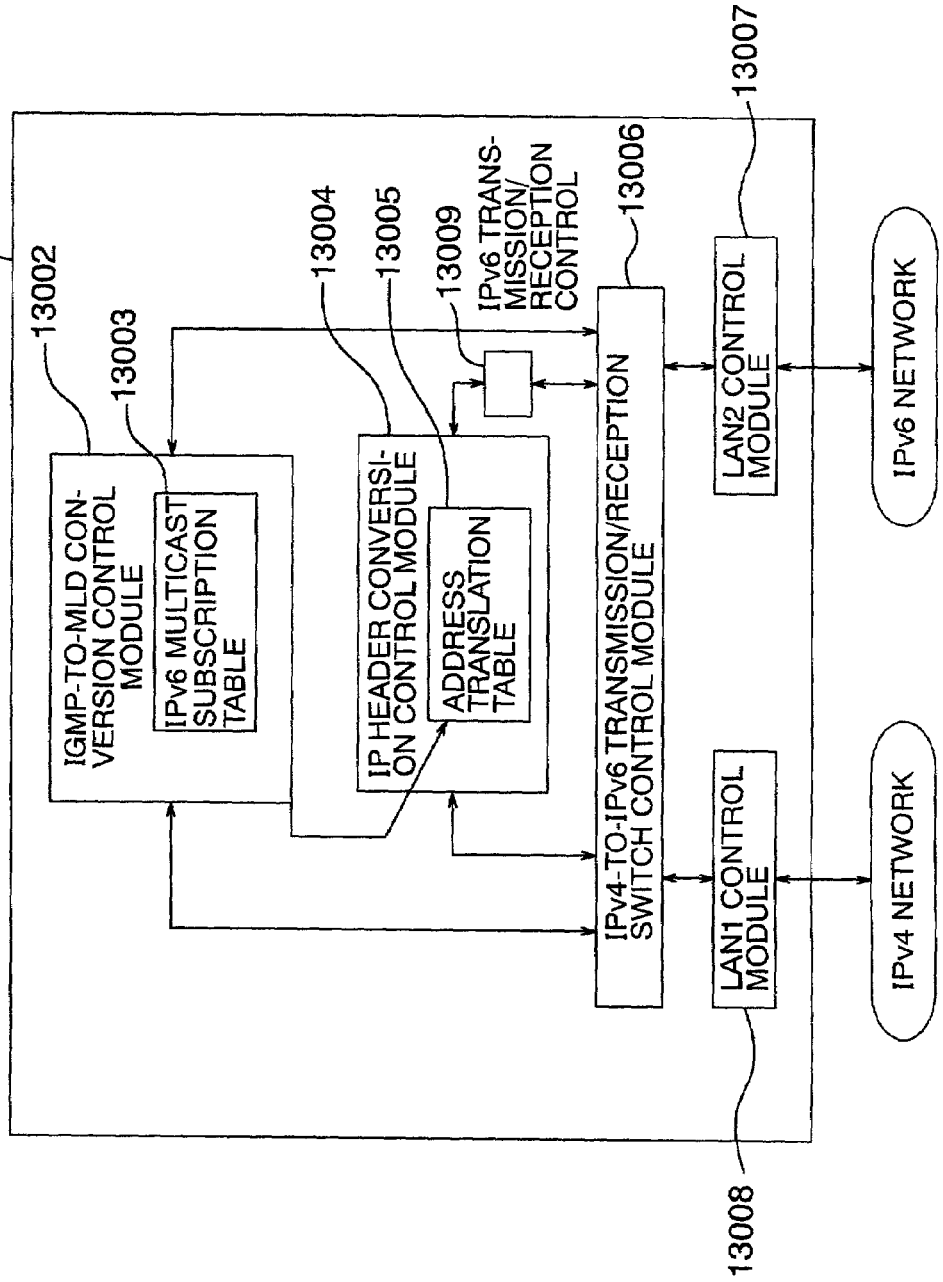
FIG. 14 is a diagram showing another construction of an LAN control apparatus.

Subsequently, another example of a construction of the LAN control apparatus will be described. FIG. 14 is a diagram showing another construction of the LAN control apparatus.

In FIG. 14, an LAN control apparatus 13001 comprises: an IGMP-to-MLD translation control module 13002; an IP header translation control module 13004; an IPv4-to-IPv6 transmission/reception switch control module 13006; an LAN1 control module 13008; an LAN2 control module 13007; and an IPv6 transmission/reception control module 13009. The IGMP-to-MLD translation control module 13002 performs a translation between the IGMP packet and the MLD packet by using information registered in an IPv6 multicast subscription table 13003. The IP header conversion control module 13004 performs a conversion between the IPv4 header and the IPv6 header by using information registered in an address translation table 13005. The LAN control apparatus 13001 has at least two interfaces. One of the interfaces is connected to the IPv4 network and the other is connected to the IPv6 network. The LAN1 control module 13008 controls the transmission and reception of the data packet to/from the IPv4 network. The LAN2 control module 13007 controls the transmission and reception of the data packet to/from the IPv6 network.

In a manner similar to the LAN control apparatus 1001 shown in FIG. 1, each component element of the LAN control apparatus 13001 is constructed as a program (software). For example, the other component elements excluding the LAN1 control module 13008 and LAN2 control module 13007 are constructed as one program. Each of the LAN1 control module 13008 and LAN2 control module 13007 is constructed as an independent program. Each of those programs is installed into, for example, the information processing apparatus shown in FIG. 2 and stored into an arbitrary area in the memory 2002 in the information processing apparatus. The CPU 2001 in the information processing apparatus executes those programs, so that the LAN control apparatus 13001 operates.

An input/output interface between the control modules of the LAN control apparatus 13001 will now be described.

A case where the LAN control apparatus 13001 transmits the data packet received from the IPv4 network to the IPv6 network will be first explained. When the data packet is received from the IPv4 network, the LAN1 control module 13008 sends it to the IPv4-to-IPv6 transmission/reception switch control module 13006. The IPv4-to-IPv6 transmission/reception switch control module 13006 checks a header in the data packet and discriminates whether the data packet is the IGMP packet or the other IPv4 packet. If the data packet is the IPv4 packet other than the IGMP packet, the IPv4-to-IPv6 transmission/reception switch control module 13006 sends the IPv4 packet to the IP header conversion control module 13004. When the data packet is the IGMP packet, the control module 13006 sends the IGMP packet to the IGMP-to-MLD translation control module 13002.

When the IPv4 packet is received, the IP header conversion control module 13004 translates the two IPv4 addresses inserted in the Destination Address field and the Source Address field of the IPv4 header into the IPv6 addresses by using information registered in the address translation table 13005, respectively. If the IPv4 address inserted in the Source Address field of the IPv4 header is not registered in the address translation table 1014, for example, the IP header conversion control module 1010 forms the IPv6 address of 128 bits by adding a fixed pattern of 96 bits to the IPv4 address. The control module 1010 converts the IPv4 header into the IPv6 header and translates the received IPv4 packet into the IPv6 packet. The IP header conversion control module 13004 sends the translated IPv6 packet to the IPv4-to-IPv6 transmission/reception switch control module 13006. The IPv4-to-IPv6 transmission/reception switch control module 13006 sends the received IPv6 packet to the LAN2 control module. The LAN2 control module sends the IPv6 packet to the IPv6 network.

When the IGMP packet is received, the IGMP-to-MLD translation control module 13002 translates the IPv4 multicast address inserted in the Group Address field of the IGMP header into the IPv6 multicast address by using the IPv6 multicast subscription table 13003 and converts the IGMP header into the MLD header. The IGMP-to-MLD translation control module 13002 translates the two IPv4 addresses inserted in the Destination Address field and the Source Address field of the IPv4 header of the IGMP packet into the IPv6 addresses by using information registered in the multicast subscription table 13003 or address translation table 13005, respectively. If the IPv4 address inserted in the Source Address field of the IPv4 header is not registered in the address translation table 1014, the IPv4 address is translated into the IPv6 address by, for example, a method similar to that for the IP header conversion control module 1010 and the IPv4 header is converted into the IPv6 header. Thus, the received IGMP packet is translated into the MLD packet. The IGMP-to-MLD translation control module 13002 sends the MLD packet to the IPv4-to-IPv6 transmission/reception switch control module 13006. The IPv4-to-IPv6 transmission/reception switch control module 13006 sends the received MLD packet to the LAN2 control module. The LAN2 control module sends the MLD packet to the IPv6 network.

A case where the LAN control apparatus 13001 transmits the data packet received from the IPv6 network to the IPv4 network will now be described. When the data packet is received from the IPv6 network, the LAN2 control module 13007 sends it to the IPv4-to-IPv6 transmission/reception switch control module 13006. The IPv4-to-IPv6 transmission/reception switch control module 13006 checks the header in the data packet and discriminates whether the data packet is the MLD packet or the other IPv6 packet. If the data packet is the IPv6 packet other than the MLD packet, the IPv4-to-IPv6 transmission/reception switch control module 13006 sends the IPv6 packet to the IP header conversion control module 13004. When the data packet is the MLD packet, the MLD packet is sent to the IGMP-to-MLD translation control module 13002.

When the IPv6 packet is received, the IP header conversion control module 13004 translates the two IPv6 addresses inserted in the Destination Address field and the Source Address field of the IPv6 header into the IPv4 addresses by using the information registered in the address translation table 13005, respectively. For example, if the IPv6 address inserted in the Source Address field of the IPv6 header is not registered in the address translation table 1014, the IP header conversion control module 1010 selects an arbitrary one of the one or more IPv4 addresses which have previously been obtained and pooled and translates the IPv6 address into the selected IPv4 address. The correspondence information between the IPv6 address and the IPv4 address is registered into the address translation table 1014. As mentioned above, the IPv6 header is converted into the IPv4 header and the received IPv6 packet is translated into the IPv4 packet. The IP header conversion control module 13004 sends the translated IPv4 packet to the IPv4-to-IPv6 transmission/reception switch control module 13006. The IPv4-to-IPv6 transmission/reception switch control module 13006 sends the received IPv4 packet to the LAN1 control module. The LAN1 control module sends the IPv4 packet to the IPv4 network.

When the MLD packet is received, the IGMP-to-MLD translation control module 13002 translates the IPv6 multicast address inserted in the Multicast Address field of the MLD header into the IPv4 multicast address by using the IPv6 multicast subscription table 13003 and converts the MLD header into the IGMP header. The IGMP-to-MLD translation control module 13002 translates the two IPv6 addresses inserted in the Destination Address field and the Source Address field of the IPv6 header of the MLD packet into the IPv4 addresses by using the information registered in the multicast subscription table 13003 or address translation table 13005, respectively. For example, if the IPv4 address inserted in the Source Address field of the IPv6 header is not registered in the address translation table 1014, the IPv6 address is translated into the IPv4 address by a method similar to that for the IP header conversion control module 1010. The IPv4 header is converted into the IPv6 header. Thus, the received MLD packet is translated into the IGMP packet. The IGMP-to-MLD translation control module 13002 sends the IGMP packet to the IPv4-to-IPv6 transmission/reception switch control module 13006. The IPv4-to-IPv6 transmission/reception switch control module 13006 sends the received IGMP packet to the LAN1 control module. The LAN1 control module sends the IGMP packet to the IPv4 network.

Figure 15:
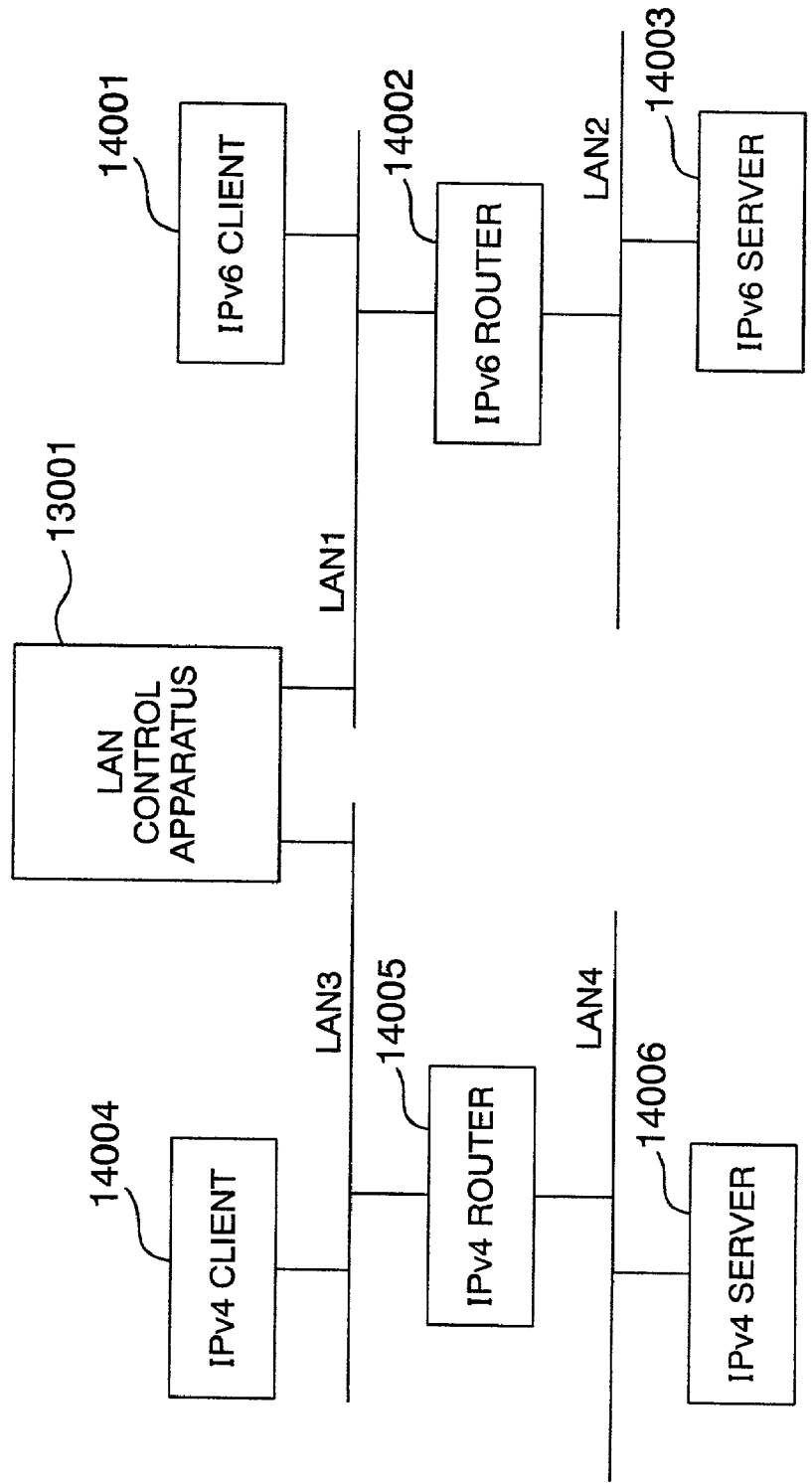
FIG. 15 is a diagram showing another construction of a communication network system.
Figure 16:
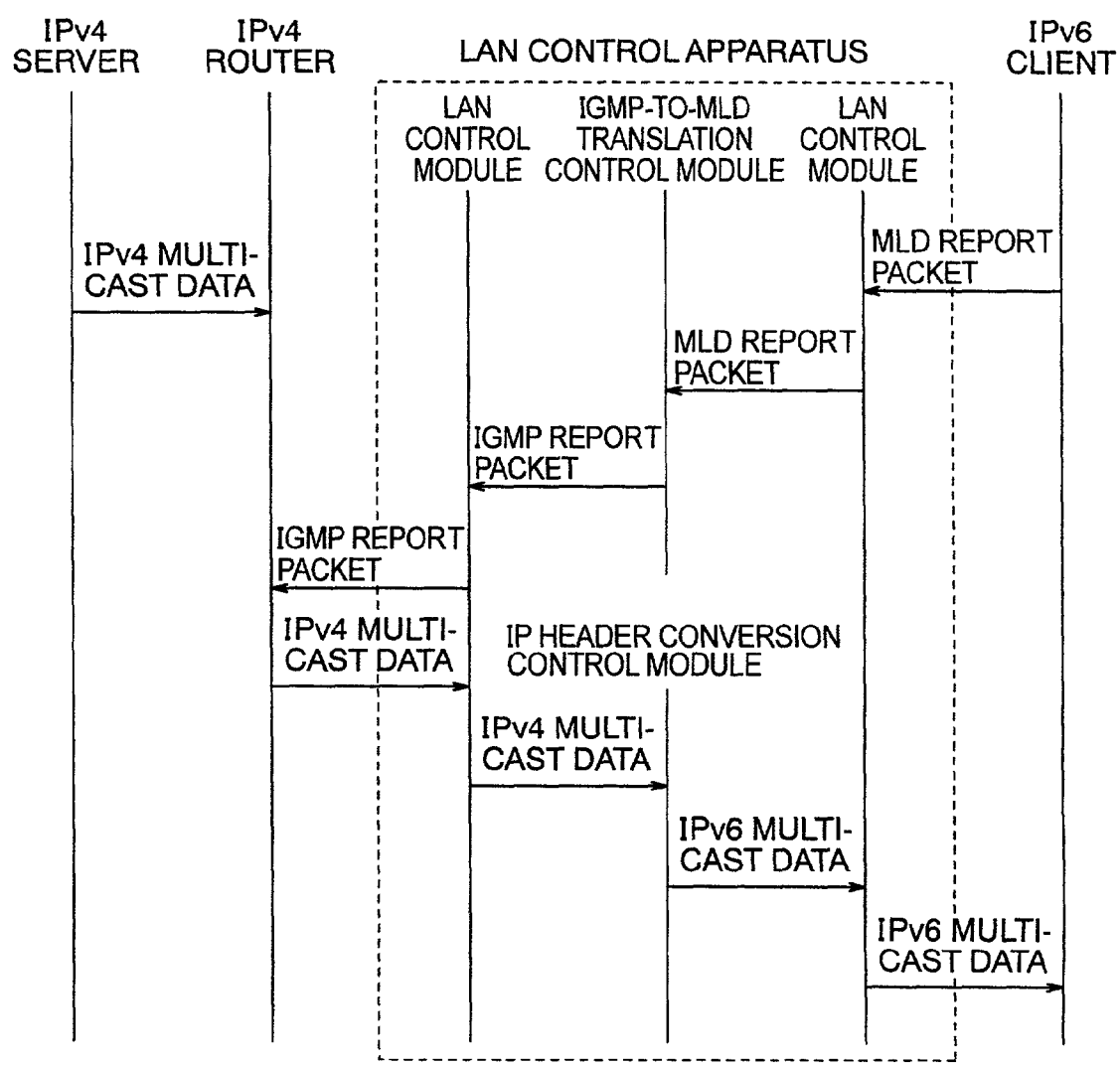
FIG. 16 is a sequence diagram of packet data in the communication network system shown in FIG. 15.
Figure 17:
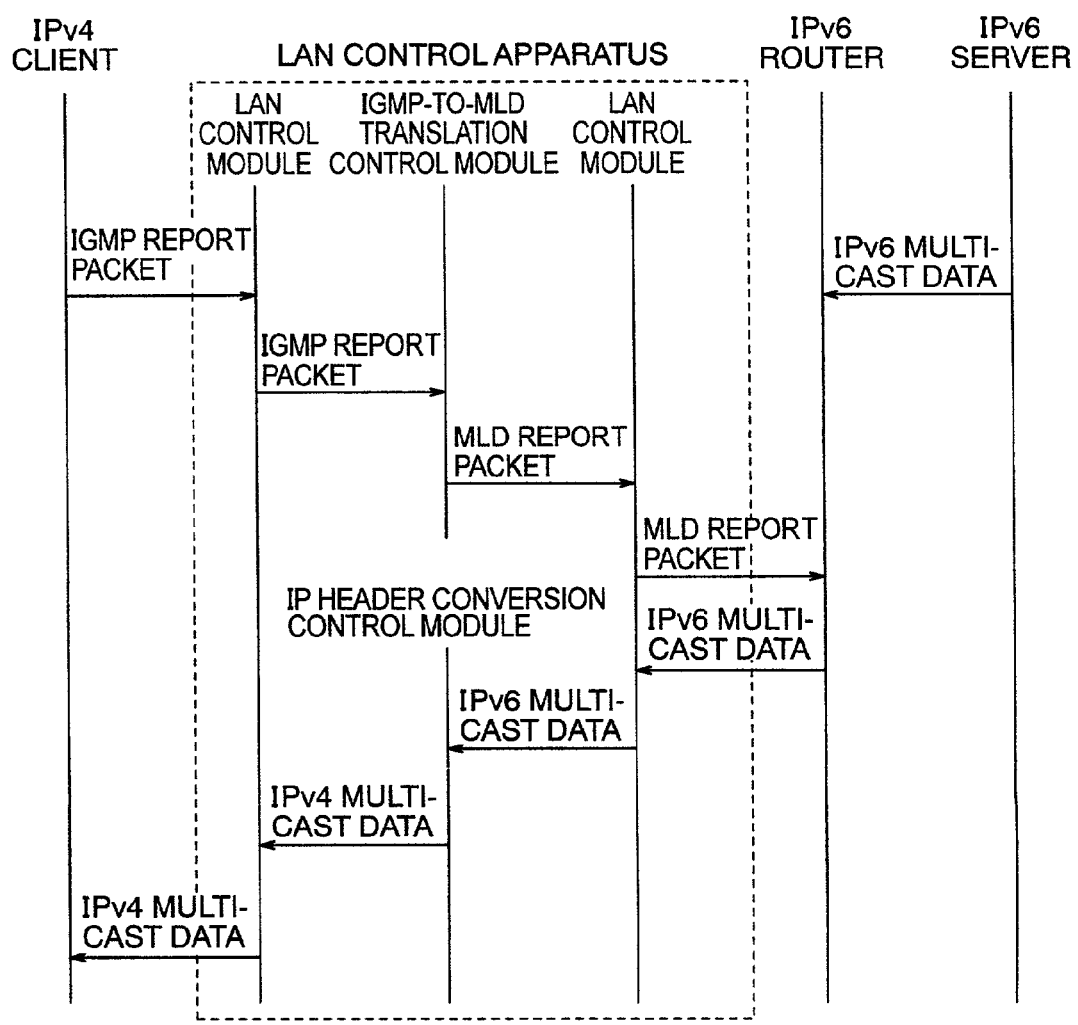
FIG. 17 is a sequence diagram of packet data in the communication network system shown in FIG. 15.

Subsequently, a flow of data in the communication network system will now be described. FIG. 15 is a diagram showing another construction of the communication network system. FIGS. 16 and 17 are sequence diagrams of the data packet in the communication network system shown in FIG. 15.

In FIG. 15, an IPv6 client 14001 is connected to the LAN1. An IPv6 server 14003 is connected to the LAN2. The LAN1 and LAN2 are connected by an IPv6 router 14002. A TCP/IPv6-compatible multicast AP operates in the IPv6 client 14001 and IPv6 server 14003. An IPv4 client 14004 is connected to an LAN3. An IPv4 server 14006 is connected to an LAN4. The LAN3 and LAN4 are connected by an IPv4 router 14005. A TCP/IPv4-compatible multicast AP operates in the IPv4 client 14004 and IPv4 server 14006. The LAN control apparatus 13001 connects an IPv6 multicast network which is formed by the LAN1 and LAN2 and an IPv4 multicast network which is formed by the LAN3 and LAN4.

First, a data sequence until the IPv6 client 14001 receives the multicast data packet which is transmitted from the IPv4 server 14006 will be described with reference to FIG. 16.

The IPv4 server 14006 continuously transmits the IPv4 multicast data packet to the LAN4. However, since the IPv4 router 14005 does not recognize the client connected to the LAN3 or does not register it as a member of the group of the multicast communication, the IPv4 multicast data packet is not routed to the LAN3.

To receive the multicast data packet which is transmitted from the IPv4 server 14006, the IPv6 client 14001 sends the MLD packet in which the TYPE field of the MLD header indicates "Multicast Listener Report" to the LAN1.

When the MLD packet is received from the LAN1, the LAN2 control module 13007 of the LAN control apparatus 13001 sends the MLD packet to the IPv4-to-IPv6 transmission/reception switch control module 13006. The IPv4-to-IPv6 transmission/reception switch control module 13006 sends the MLD packet to the IGMP-to-MLD translation control module 13002. The IGMP-to-MLD translation control module 13002 translates the MLD packet into the IGMP packet as mentioned above. In the IGMP packet, the TYPE field of the IGMP header indicates "Membership Report". The IGMP-to-MLD translation control module 13002 sends the IGMP packet to the IPv4-to-IPv6 transmission/reception switch control module 13006. The IPv4-to-IPv6 transmission/reception switch control module 13006 sends the IGMP packet to the LAN1 control module 13008. The LAN1 control module 13008 sends the IGMP packet to the LAN3.

When the IGMP packet is received from the LAN3, the IPv4 router 14005 recognizes the fact that the client exists on the LAN3 side. The IPv4 router routes the IPv4 multicast data packet sent from the IPv4 server 14006 to the LAN3.

When the IPv4 multicast data packet is received from the LAN3, the LAN1 control module 13008 of the LAN control apparatus 13001 sends it to the IPv4-to-IPv6 transmission/reception switch control module 13006. The IPv4-to-IPv6 transmission/reception switch control module 13006 sends the IPv4 multicast data packet to the IP header conversion control module 13004. The IP header conversion control module 13004 translates the IPv4 multicast data packet into the IPv6 multicast data packet as mentioned above and sends it to the IPv4-to-IPv6 transmission/reception switch control module 13006. The IPv4-to-IPv6 transmission/reception switch control module 13006 sends the IPv6 multicast data packet to the LAN2 control module 13007. The LAN2 control module 13007 sends the IPv6 multicast data packet to the LAN1.

The IPv6 client 14001 receives the IPv6 multicast data packet from the LAN1. Thus, the multicast communication from the IPv4 server 14006 to the IPv6 client 14001 is established.

Subsequently, a data sequence until the IPv4 client 14004 receives the multicast data packet which is sent from the IPv6 server 14003 will be described with reference to FIG. 17.

The IPv6 server 14003 continuously transmits the IPv6 multicast data packet to the LAN2. However, at this time point, since the IPv6 router 14002 does not recognize the client connected to the LAN1 or it is not registered as a member of the group of the multicast communication, the IPv6 multicast data packet is not routed to the LAN1.

The IPv4 client 14004 sends the IGMP packet in which the Type field of the IGMP header indicates "Membership Report" to the LAN3 in order to receive the multicast data packet which is transmitted from the IPv6 server 14003.

When the IGMP packet is received from the LAN3, the LAN1 control module 13008 of the LAN control apparatus 13001 sends it to the IPv4-to-IPv6 transmission/reception switch control module 13006. The IPv4-to-IPv6 transmission/reception switch control module 13006 sends the IGMP packet to the IGMP-to-MLD translation control module 13002. The IGMP-to-MLD translation control module 13002 translates the IGMP packet into the MLD packet as mentioned above. In the MLD packet, the TYPE field of the MLD header indicates "Multicast Listener Report". The IGMP-to-MLD translation control module 13002 sends the MLD packet to the IPv4-to-IPv6 transmission/reception switch control module 13006. The IPv4-to-IPv6 transmission/reception switch control module 13006 sends the MLD packet to the LAN2 control module 13007. The LAN2 control module 13007 sends the MLD packet to the LAN1.

When the MLD packet is received from the LAN1, the IPv6 router 14002 recognizes the fact that the client exists on the LAN1 side. The IPv6 router 14002 routes the IPv6 multicast data packet sent from the IPv6 server 14003 to the LAN1.

When the IPv6 multicast data packet is received from the LAN1, the LAN2 control module 13007 of the LAN control apparatus 13001 sends it to the IPv4-to-IPv6 transmission/reception switch control module 13006. The IPv4-to-IPv6 transmission/reception switch control module 13006 sends the IPv6 multicast data packet to the IP header conversion control module 13004. The IP header conversion control module 13004 translates the IPv6 multicast data packet into the IPv4 multicast data packet as mentioned above and sends it to the IPv4-to-IPv6 transmission/reception switch control module 13006. The IPv4-to-IPv6 transmission/reception switch control module 13006 sends the IPv4 multicast data packet to the LAN1 control module 13008. The LAN1 control module 13008 sends the IPv4 multicast data packet to the LAN3.

The IPv4 client 14004 receives the IPv4 multicast data packet from the LAN3. Thus, the multicast communication from the IPv6 server 14003 to the IPv4 client 14004 is established.

The foregoing LAN control apparatus and the translation method, processing method, and communication method of the data packet in the protocol translation control module can be provided as an LAN control apparatus, a recording medium on which a program constructing the protocol translation control module has been recorded, or a program product including such a medium can be provided.

As mentioned above, the protocol translation control module is provided between the protocol control module and LAN control module constructing the LAN control apparatus and the IGMP-to-MLD translation control module is further provided in the protocol translation control module. Thus, the conversion of the headers (MLD header and IGMP header) of the control packets (MLD packet and IGMP packet) which are transmitted and received between the protocol control module and the LAN control module can be performed. Therefore, the TCP/IPv4-compatible multicast AP on the PC/WS can directly request the IPv6 network to distribute the multicast data packet and can directly transmit and receive the multicast data packet.

The IP header conversion control module and the IGMP-to-MLD translation control module are provided for the LAN control apparatus in the inter-network connecting apparatus (router, switch, etc.). Thus, the IPv6 host can receive the multicast data packet which is outputted from the IPv4 host and the IPv4 host can receive the IP multicast packet which is outputted from the IPv6 host.

What is claimed is:

1. A multicast communication method of allowing a communication control apparatus for performing communication in accordance with an Internet protocol version 4 (IPv4) to communicate with a communication control apparatus for performing communication in accordance with an Internet protocol version 6 (IPv6), comprising the steps of:
when an IPv4 multicast packet is inputted, discriminating that said packet is a data packet on the basis of its IPv4 header;

when it is determined that said packet is the data packet, converting the IPv4 header of the IPv4 multicast packet into an IPv6 header and generating an IPv6 multicast packet;

outputting the generated IPv6 multicast packet to an IPv6 network;

when an IPv4-compatible multicast control packet (IGMP packet) is inputted, discriminating that said packet is an IGMP packet of a request for multicast group subscription on the basis of an IGMP header;

when it is determined that the packet is the IGMP packet of the request for multicast group subscription, translating the IGMP packet and generating an IPv6-compatible multicast control packet (MLP packet);

registering correspondence information between an IPv4 multicast address and an IPv6 multicast address; and outputting the MLD packet to the IPv6 network.

2. A method according to claim 1, further comprising the step of translating an MLD packet which is outputted from another communication control apparatus including an IPv6 multicast router into the IGMP packet.

* * * * *